US012683684B2

(12) United States Patent

Cho et al.

(10) Patent No.: US 12,683,684 B2

(45) Date of Patent: Jul. 14, 2026

(54) COMMUNICATION DEVICE COMBINING COMMUNICATION FUNCTION AND POSITIONING FUNCTION AND OPERATION METHOD THEREOF

(71) Applicant: ELECTRONICS AND TELECOMMUNICATIONS RESEARCH INSTITUTE, Daejeon (KR)

(72) Inventors: Seung-Hyun Cho, Sejong-si (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 320 days.

(21) Appl. No.: 18/491,215

(22) Filed: Oct. 20, 2023

(65) Prior Publication Data

US 2024/0178915 A1 May 30, 2024

(30) Foreign Application Priority Data

Nov. 24, 2022 (KR) ........................ 10-2022-0159363

(51) Int. Cl.
*H04B 10/112* (2013.01)
*H04B 10/516* (2013.01)

(52) U.S. Cl.
CPC ......... *H04B 10/112* (2013.01); *H04B 10/516* (2013.01)

(58) Field of Classification Search
CPC .................... H04B 10/11–1149; H04B 10/516
See application file for complete search history.

(56) References Cited

U.S. PATENT DOCUMENTS 10,288,979 B1 * 5/2019 Wang ......................... G02F 1/29
2008/0212974 A1 * 9/2008 Davies ............... H04B 10/2575
398/140

(Continued)

FOREIGN PATENT DOCUMENTS

CN 115032643 A 9/2022
KR 10-2021-0009134 A 1/2021

(Continued)

OTHER PUBLICATIONS

Y. Wang et al., "Integrated High-Resolution Radar and Long-Distance Communication Based-on Photonic in Terahertz Band," in Journal of Lightwave Technology, vol. 40, No. 9, pp. 2731-2738, 1 May 1, 2022, doi: 10.1109/JLT.2022.3143849. (Year: 2022).*

(Continued)

*Primary Examiner* — Nathan M Cors
(74) *Attorney, Agent, or Firm* — LRK PATENT LAW FIRM

(57) ABSTRACT

A communication device combining a communication function and a positioning function and an operation method thereof are provided. The communication device includes a photonics-based sub-terahertz (sub-THz) transmission unit configured to transmit a terahertz (THz) signal generated by beating two optical signals having different wavelengths and a positioning unit configured to determine a position of a target using the THz signal transmitted by the photonics-based sub-THz transmission unit and received by the positioning unit by being reflected by the target, wherein the photonics-based sub-THz transmission unit is configured to adjust a transmission direction of the THz signal based on the position of the target determined by the positioning unit.

13 Claims, 4 Drawing Sheets

(56) References Cited

U.S. PATENT DOCUMENTS

| | | | |
|---|---|---|---|
| 2016/0091776 A1* | 3/2016 | Mohammed | G01N 21/3586 |
| | | | 250/341.1 |
| 2018/0176797 A1 | 6/2018 | Barros et al. | |
| 2025/0087893 A1* | 3/2025 | Kocabas | G02F 1/292 |

FOREIGN PATENT DOCUMENTS

| | | |
|---|---|---|
| KR | 10-2021-0058312 A | 5/2021 |
| KR | 10-2022-0129249 A | 9/2022 |

OTHER PUBLICATIONS

S. R. Moon et al., "6G Indoor Network Enabled by Photonics- and Electronics-Based sub-THz Technology," in Journal of Lightwave Technology, vol. 40, No. 2, pp. 499-510, 15, Jan. 15, 2022, doi: 10.1109/JLT.2021.3113898. (Year: 2022).*
Yanyi Wang et al. "Integrated High-Resolution Radar and Long-Distance Communication Based-on Photonic in Terahertz Band", Journal of Lightwave Technology, vol. 40, No. 9, May 1, 2022.

\* cited by examiner

THz AP3

THz AP2

3D hologram

THz UE

THz AP1

Indoor Localization

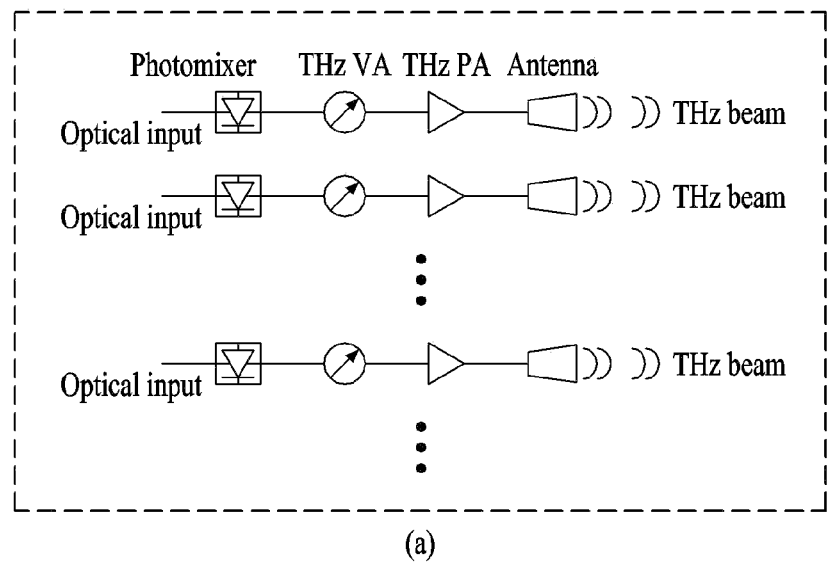

Photomixer    THz VA  THz PA   Antenna

Optical input

Optical input

Optical input

THz beam

THz beam

THz beam (a)

Local
Oscillator

Electrical IF output                                    Antenna

RF amp.              THz Mixer                            THz beam
                                          THz LNA         for comm.

Local
Oscillator

RF amp.                                                   Antenna
                    Optical
                    Modulator    THz Mixer                THz beam
Photodetector       w filter              THz LNA         for sensing Local
Oscillator Electrical IF output                                     Antenna THz Mixer                             THz beam
                                          THz LNA         for comm.

Local
Oscillator

RF amp.                                                   Antenna
                    Optical
                    Modulator    THz Mixer                THz beam
Photodetector       w filter              THz LNA         for sensing (b)

FIG. 3

COMMUNICATION DEVICE COMBINING COMMUNICATION FUNCTION AND POSITIONING FUNCTION AND OPERATION METHOD THEREOF

CROSS-REFERENCE TO RELATED APPLICATION

This application claims the benefit of Korean Patent Application No. 10-2022-0159363 filed on Nov. 24, 2022, in the Korean Intellectual Property Office, the entire disclosure of which is incorporated herein by reference for all purposes.

BACKGROUND

1. Field of the Invention

One or more embodiments relate to photonics-based sub-terahertz (sub-THz) communication technology providing an ultra-wideband data transmitter/receiver function and a high-precision positioning function in an indoor environment.

2. Description of Related Art

In order to realize extended Reality (XR) and hologram services, which are representative services of the sixth generation (6G) of mobile systems, indoor wireless communication technology capable of providing μs-class latency and transmitting Terabytes per second (Tbps)-class data is required. Interest in front-end technology for wireless communication using a sub-terahertz (sub-THz) frequency band in order to provide a service having the above-described ultra-wideband/ultra-low latency to users has been increasing more than ever.

However, sub-THz communication technology has a coverage limitation due to high propagation loss, and thus, commercialization of the technology is difficult.

SUMMARY

Embodiments provide a communication device combining a communication function and a positioning function by utilizing photonics-based terahertz (THz) wireless communication technology and an operation method of the communication device.

However, technical aspects are not limited to the foregoing aspect and there may be other technical aspects.

According to an aspect, there is provided a communication device combining a communication function and a positioning function including a photonics-based sub-terahertz (sub-THz) transmission unit configured to transmit a terahertz (THz) signal generated by beating two optical signals having different wavelengths and a positioning unit configured to determine a position of a target using the THz signal transmitted by the photonics-based sub-THz transmission unit and received by the positioning unit by being reflected by the target, wherein the photonics-based sub-THz transmission unit is configured to adjust a transmission direction of the THz signal based on the position of the target determined by the positioning unit.

The photonics-based sub-THz transmission unit may include a first optical signal generator, a first optical modulator configured to optically modulate a first optical signal that is output by the first optical signal generator, based on an externally input baseband data signal, a second optical signal generator configured to output a second optical signal having a different wavelength from a wavelength of the first optical signal, a first photodetector configured to generate a THz signal by beating the first optical signal and the second optical signal, and at least one transmitting antenna configured to transmit the generated THz signal.

The positioning unit may include at least one receiving antenna for sensing configured to receive a THz signal reflected by the target, a mixer configured to convert a THz signal received through the receiving antenna for sensing into a baseband signal, a second optical modulator configured to output a third optical signal by optically modulating the baseband signal obtained through conversion by the mixer, based on a first optical signal optically modulated by a first optical modulator of the photonics-based sub-THz transmission unit, a second photodetector configured to generate an optical beating signal by beating the third optical signal and the first optical signal, and a digital signal processor (DSP) configured to measure the position of the target using the optical beating signal.

The DSP may be configured to measure the position of the target using a time delay of the optical beating signal and a speed of the optical beating signal.

A plurality of receiving antennas for sensing included in the positioning unit may be disposed at positions separated by a same distance from a receiving antenna for communication included in a photonics-based sub-THz receiver.

An operation method of a communication device combining a communication function and a positioning function includes transmitting, by a photonics-based sub-terahertz (sub-THz) transmission unit, a terahertz (THz) signal generated by beating two optical signals having different wavelengths and determining, by a positioning unit, a position of a target using the THz signal transmitted by the photonics-based sub-THz transmission unit and received by the positioning unit by being reflected by the target, wherein the transmitting of the THz signal includes adjusting a transmission direction of the THz signal based on the position of the target determined by the positioning unit.

The transmitting of the THz signal may include providing a first optical signal by a first optical signal generator, optically modulating, by a first optical modulator, the output first optical signal based on an externally injected baseband data signal, producing, by a second optical signal generator, a second optical signal having a different wavelength from a wavelength of the first optical signal, generating, by a first photodetector, a THz signal by beating the first optical signal and the second optical signal, and transmitting the generated THz signal through at least one transmitting antenna.

The determining of the position of the target may further include receiving a THz signal reflected by the target through at least one receiving antenna for sensing, converting, by a mixer, a THz signal received through the receiving antenna for sensing into a baseband signal, providing, by a second optical modulator, a third optical signal by optically modulating the baseband signal obtained through the conversion based on a first optical signal optically modulated by a first optical modulator of the photonics-based sub-THz transmission unit, generating, by a second photodetector, an optical beating signal by beating the third optical signal and the first optical signal, and measuring, by a DSP, the position of the target using the optical beating signal.

The measuring of the position of the target may include measuring the position of the target using a time delay of the optical beating signal and a speed of the optical beating signal.

A plurality of receiving antennas for sensing included in the positioning unit may be disposed at positions separated by a same distance from a receiving antenna for communication included in a photonics-based sub-THz receiver.

A communication system combining a communication function and a positioning function includes a photonics-based sub-terahertz (sub-THz) transmission unit configured to transmit a terahertz (THz) signal generated by beating two optical signals having different wavelengths, a photonics-based sub-THz receiver unit configured to receive a THz signal transmitted from another transmission unit using a local oscillator (LO) signal, and a positioning unit configured to determine a position of a target using the THz signal transmitted by the photonics-based sub-THz transmission unit and received by the positioning unit by being reflected by the target, wherein the photonics-based sub-THz transmission unit is configured to adjust a transmission direction of the THz signal based on the position of the target determined by the positioning unit.

The photonics-based sub-THz transmission unit may include a first optical signal generator, a first optical modulator configured to optically modulate a first optical signal that is provided by the first optical signal generator, based on an externally injected baseband data signal, a second optical signal generator configured to produce a second optical signal having a different wavelength from a wavelength of the first optical signal, a first photodetector configured to generate a THz signal by beating the first optical signal and the second optical signal, and at least one transmitting antenna configured to transmit the generated THz signal.

The photonics-based sub-THz receiver unit may include at least one receiving antenna for communication configured to receive a THz signal transmitted by another photonics-based sub-THz transmission unit, a first mixer configured to convert a THz signal received through the receiving antenna for communication into a baseband signal, and a baseband signal processor configured to restore a data signal from the baseband signal obtained through conversion by the first mixer.

The positioning unit may include at least one receiving antenna for sensing configured to receive a THz signal reflected by the target, a second mixer configured to convert a THz signal received through the receiving antenna for sensing into a baseband signal, a second optical modulator configured to output a third optical signal by optically modulating the baseband signal obtained through conversion by the second mixer, based on a first optical signal optically modulated by a first optical modulator of the photonics-based sub-THz transmission unit, a second photodetector configured to generate an optical beating signal by beating the third optical signal and the first optical signal, and a DSP configured to measure the position of the target using the optical beating signal.

The DSP may be configured to measure the position of the target using a time delay of the optical beating signal and a speed of the optical beating signal.

A plurality of receiving antennas for sensing included in the positioning unit may be disposed at positions separated by a same distance from a receiving antenna for communication included in a photonics-based sub-THz receiver.

Additional aspects of embodiments will be set forth in part in the description which follows and, in part, will be apparent from the description, or may be learned by practice of the disclosure.

According to an embodiment, a communication device combining a communication function and a positioning function by utilizing photonics-based sub-terahertz (sub-THz) wireless communication technology and an operation method of the communication device may be provided.

In addition, according to an embodiment of the present disclosure, the communication device combining a communication function and a positioning function may be used in various fields such as location aware communication, autonomous driving, and industrial Internet of things (IoT) by applying the communication device to the sixth generation (6G) of mobile systems and Beyond 6G (B6G).

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 is diagrams illustrating front-end structures of a photonics-based sub-THz communication and positioning system according to an embodiment.

DETAILED DESCRIPTION

Figure 1:
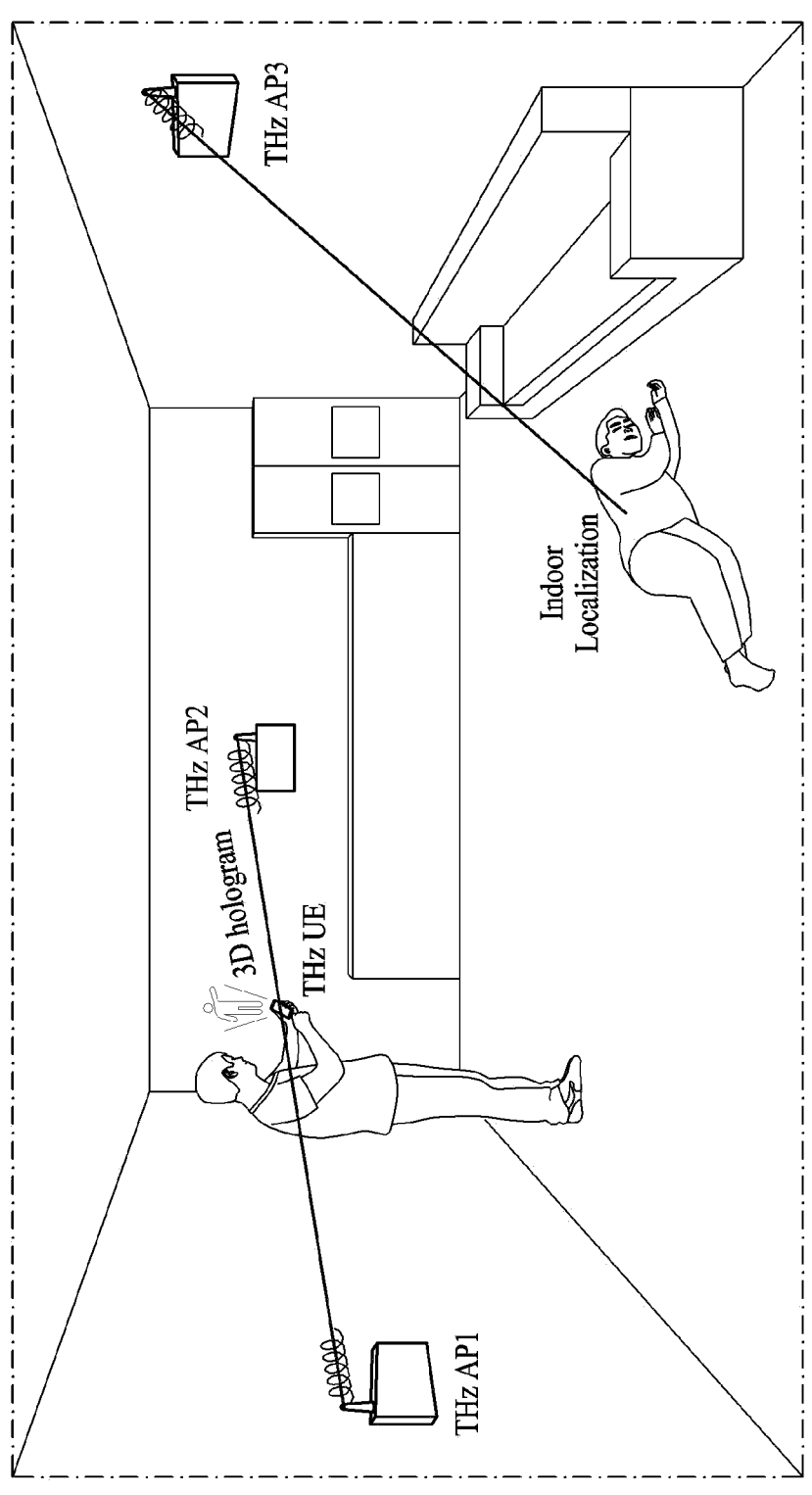
FIG. 1 is a diagram illustrating an application concept of photonics-based sub-terahertz (sub-THz) front-end technology according to an embodiment.

The following detailed structural or functional description is provided as an example only and various alterations and modifications may be made to embodiments. Thus, an actual form of implementation is not construed as limited to the embodiments described herein and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected," "coupled," or "joined" to another component, the first component may be directly connected, coupled, or joined to the second component, or a third component may be "connected," "coupled," or "joined" between the first and second components.

The singular forms "a," "an," and "the" are intended to include the plural forms as well, unless the context clearly indicates otherwise. As used herein, each of phrases such as "A or B," "at least one of A and B," "at least one of A or B," "A, B, or C," "at least one of A, B, and C," and "at least one of A, B, or C" may include any one of the items listed in the corresponding one of the phrases or all possible combinations thereof. It will be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms such as those defined in commonly used dictionaries are to be interpreted as having a meaning that is consistent with their meaning in the context of the relevant art and are not to be interpreted in an idealized or overly formal sense unless expressly so defined herein.

The term "unit" or the like used herein may refer to a software or hardware component, such as a field-programmable gate array (FPGA) or an application-specific integrated circuit (ASIC), and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, the embodiments are described in detail with reference to the accompanying drawings. When describing the embodiments with reference to the accompanying drawings, like reference numerals refer to like components and a repeated description related thereto is omitted.

FIG. 1 is a diagram illustrating an application concept of photonics-based sub-terahertz (sub-THz) front-end technology according to an embodiment.

Sub-THz communication technology is difficult to commercialize because of the coverage limitation due to high propagation loss. However, when the application field of the communication technology is limited to an indoor network as shown in FIG. 1, it may be possible to avoid the above issue. Referring to FIG. 1, the present disclosure may provide photonics-based sub-THz communication technology combining a communication function and a positioning function in an indoor environment.

When applied to an indoor network, such photonics-based sub-THz communication technology may provide an advantage of easy connection with the existing wired fifth generation (5G)/6G radio access network (RAN) without optical/electrical conversion or frame format conversion.

In addition, the photonics-based sub-THz communication technology may, when used to configure an indoor network, use the existing matured optical communication technology to reallocate wavelength resources within the indoor network and may thus provide an advantage of easy interworking with the fourth generation (4G)/5G network currently in operation.

In order to provide an ultra-wideband/ultra-low latency/ultra-realistic service using a sub-THz beam having high directivity, it is necessary to first accurately determine a position of a terminal or a user located indoors.

To this end, a communication device according to the present disclosure may determine the position of a terminal or a user located indoors through photonics-based sub-THz communication technology and adjust the radiation direction of a sub-THz beam transmitted to the terminal or the user based on the determined position of the terminal or the user, thereby providing a higher-quality service.

Figure 2:
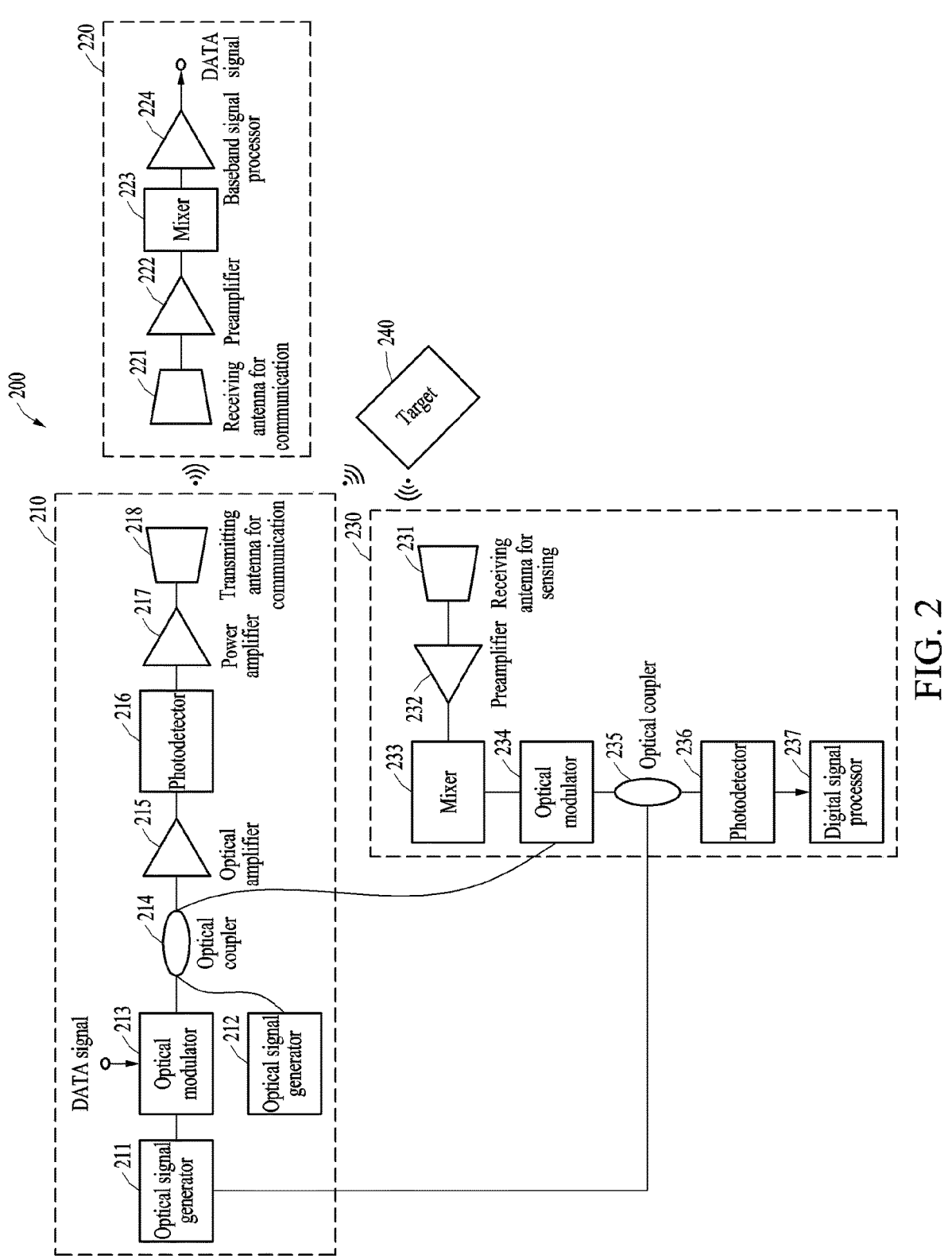
FIG. 2 is a diagram illustrating a photonics-based sub-THz communication and positioning system according to an embodiment.

FIG. 2 is a diagram illustrating a photonics-based sub-THz communication and positioning system according to an embodiment.

Referring to FIG. 2, a photonics-based sub-THz communication and positioning system 200 of the present disclosure may be configured to include a photonics-based sub-THz transmission unit 210 that may transmit a THz signal generated by beating two optical signals having different wavelengths, a photonics-based sub-THz reception unit 220 that may receive a THz signal transmitted from another transmission unit using a local oscillator (LO) signal, and a positioning unit 230 that may determine the position of a target 240 using the THz signal transmitted by the photonics-based sub-THz transmission unit 210 and received by the positioning unit 230 by being reflected by the target 240.

First, the photonics-based sub-THz transmission unit 210 may be configured to include an optical signal generator 211, an optical signal generator 212, an optical modulator 213, an optical coupler 214, an optical amplifier 215, and a photodetector 216, a power amplifier 217, and a transmitting antenna for communication 218. The optical signal generator 211 may be, for example, a laser diode (LD) that may provide an optical signal having a continuous wave (CW) characteristic. Furthermore, the optical signal generator 212 may be an LD that may generate an optical signal for an LO having a CW characteristic and operating as a beating signal in the photodetector 216 thereafter. Here, an optical signal generated by the optical signal generator 211 and an optical signal provided by the optical signal generator 212 may have different wavelengths.

The optical modulator 213 may optically modulate the optical signal provided by the optical signal generator 211 based on an externally injected baseband data signal, and the optical coupler 214 may optically couple the optical signal that is optically modulated by the optical modulator 213 with the optical signal that is produced by the optical signal generator 212.

The optical amplifier 215 may optically amplify the two optical signals that are optically coupled by the optical coupler 214, and the photodetector 216 may generate a THz signal by beating the two optical signals according to an optical heterodyne mixing principle. Here, the photodetector 216 may correspond to a photodiode or a photomixer, and the frequency of a photoelectrically converted THz signal may be determined by the difference in wavelength between the two optical signals that are optically coupled.

For example, when the wavelength of the optical signal generator 211 is 1550.12 nm and the wavelength of the optical signal generator 212 is fixed at 1552.52 nm, the frequency of the sub-THz wave photoelectrically converted by the photoelectric converter 216 may be about 300 GHz.

In this way, the THz signal generated by the photodetector 216 may be amplified by the power amplifier 217 to compensate for high propagation loss in free space before being radiated into the air and be propagated into the air using the transmitting antenna for communication 218.

The photonics-based sub-THz receiver unit 220 may be configured to include a receiving antenna for communication 221, a preamplifier 222, a mixer 223, and a baseband signal processor 224. The THz signal provided by the optical sub-THz transmission unit 210 may pass through an arbitrary wireless transmission distance and be received through the receiving antenna for communication 221 of the photonics-based sub-THz receiver unit 220.

The preamplifier 222 may compensate for propagation loss of the THz signal received through the receiving antenna for communication 221. The preamplifier 222 may be, for example, a low noise amplifier.

The mixer 223 may downconvert the THz signal of which propagation loss is compensated for by the preamplifier 222 to a signal having an intermediate carrier frequency and subsequently to a baseband signal.

The baseband signal processor 224 may restore a data signal from the baseband signal converted from the THz signal by the mixer 223. Here, the baseband signal processor 224 may include an amplifier function.

The positioning unit 230 may be configured to include a receiving antenna for sensing 231, a preamplifier 232, a mixer 233, an optical modulator 234, an optical coupler 235, a photodetector 236, and a digital signal processor 237. The THz signal output by the photonics-based sub-THz transmission unit 210 onto the free space may be reflected by the target 240 and received through the receiving antenna for sensing 231 of the positioning unit 230.

The preamplifier 232 may compensate for propagation loss of the THz signal received through the receiving antenna for sensing 231. The preamplifier 232 may be, for example, a low noise amplifier.

The mixer 233 may downconvert the THz signal of which propagation loss is compensated for by the preamplifier 232 to a signal having an intermediate frequency carrier and subsequently to a baseband signal. Here, the baseband signal downconverted from the THz signal may operate as a modulation signal to drive the optical modulator 234.

The optical modulator 234 may optically modulate the baseband signal obtained through conversion by the mixer 233 based on the optical signal optically modulated by the optical modulator 213 of the photonics-based sub-THz transmission unit 210. To this end, an optical filter for filtering unwanted components of the optical signal generated by the optical signal generator 212 may be incorporated in an input terminal of the optical modulator 234. Here, the optical modulator 234 may optically modulate the baseband signal using a double-sideband suppressed carrier (DSB-SC) technique.

The optical coupler 235 may optically combine the baseband signal optically modulated by the optical modulator 234 with the optical signal produced by the photonics-based sub-THz transmission unit 210.

The photodetector 236 may generate an optical beating signal by beating two optical signals according to the optical heterodyne mixing principle, and the digital signal processor 237 may measure the position of the target 240 using the time delay of a THz signal measured in the process of generating the optical beating signal. More specifically, the digital signal processor 237 may measure the time delay of the THz signal received by being reflected by the target 240 in the process of generating the optical beating signal and determine the position of the target 240 by dividing the measured time delay by ½ and multiplying the result value by the speed of the optical beating signal.

FIG. 3 is diagrams illustrating front-end structures of a photonics-based sub-THz communication and positioning system according to an embodiment.

Basically, in an optical communication system, the position of a target may be determined by collecting a sensing signal or a positioning signal reflected by a target. Since having a small size is a characteristic of a reflected signal, it may be difficult to extract actually meaningful information.

In order to supplement this, the photonics-based sub-THz communication and positioning system of the present disclosure may configure a transmitter/receiver front-end for communication and a transmitter/receiver front-end for sensing in an array type and improve a sensing accuracy or a positioning accuracy using the configuration.

In an example, (a) in FIG. 3 illustrates an example of implementing a transmitter-side front-end for sensing or communication in an array type, and (b) in FIG. 3 illustrates an example of implementing a receiver-side front-end for sensing or communication in an array type.

Figure 4:
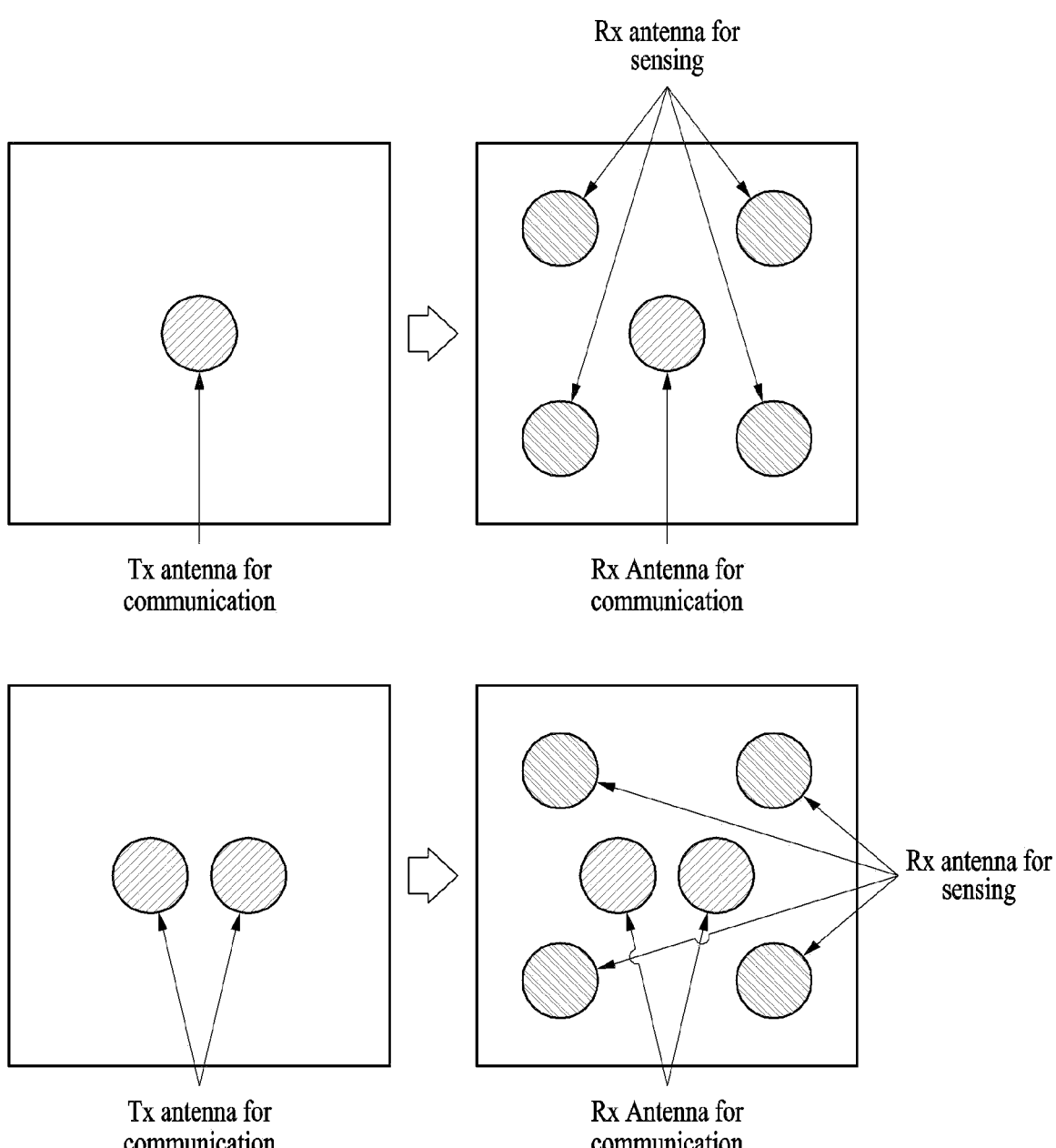
FIG. 4 is a diagram illustrating a method of disposing an antenna in an array-type front-end structure of a photonics-based sub-THz communication and positioning system, according to an embodiment.

FIG. 4 is a diagram illustrating a method of disposing an antenna in an array-type front-end structure of a photonics-based sub-THz communication and positioning system, according to an embodiment.

FIG. 4 illustrates a structure in which an antenna is disposed viewed from the front when a transmitter/receiver front-end for communication and a transmitter/receiver front-end for sensing of a photonics-based sub-THz communication and positioning system are configured in an array type.

Referring to FIG. 4, first, a transmitting antenna for communication included in the front-end of a photonics-based sub-THz transmitter unit and a receiving antenna for communication included in the front end of a photonics-based sub-THz receiver unit may be disposed in the center.

In addition, receiving antennas for sensing included in the front-end of a positioning unit may be disposed at positions separated by the same distance from the receiving antenna for communication included in the front-end of the photonics-based sub-THz receiver unit. Although four receiving antennas for sensing are illustrated in FIG. 4, this is only an example and embodiments are not limited thereto. Since the number of receiving antennas for sensing is proportional to the positioning accuracy of a target, more receiving antennas for sensing may be disposed as a high-precision application is required.

In addition, a transmitting antenna for communication and a receiving antenna for communication may be capable of beam steering in a vertical direction and a horizontal direction for a communication function and a receiving antenna for sensing may be capable of beam steering in a vertical direction and a horizontal direction for a positioning function.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using a hardware component, a software component, and/or a combination thereof. For example, a processing device may be implemented using one or more general-purpose or special-purpose computers, such as, for example, a processor, a controller, an arithmetic logic unit (ALU), a DSP, a microcomputer, an FPGA, a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the processing device is described as singular. However, one of ordinary skill in the art will appreciate that a processing device may include multiple processing elements and/or multiple types of processing elements. For example, the processing device may include a plurality of processors, or a single processor and a single controller. In addition, a different processing configuration is possible, such as one including parallel processors.

The software may include a computer program, a piece of code, an instruction, or one or more combinations thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed fashion. The software and data may be stored in a non-transitory computer-readable recording medium.

The methods according to the embodiments may be recorded in non-transitory computer-readable media including program instructions to implement various operations of the embodiments. The media may also include the program instructions, data files, data structures, and the like alone or in combination. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random-access memory (RAM), flash memory, and the like. Examples of program instructions include both machine code, such as those produced by a compiler, and files containing high-level code that may be executed by the computer using an interpreter.

The above-described hardware devices may be configured to act as one or more software modules in order to perform the operations of the above-described examples, or vice versa.

Although the embodiments have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. A communication device combining a communication function and a positioning function, the communication device comprising:

a photonics-based sub-terahertz (sub-THz) transmission unit configured to transmit a sub-THz signal generated by beating two optical signals having different wavelengths; and a positioning unit configured to determine a position of a target using the sub-THz signal transmitted by the photonics-based sub-THz transmission unit and received by the positioning unit by being reflected by the target, wherein the photonics-based sub-THz transmission unit is configured to adjust a transmission direction of the sub-THz signal based on the position of the target determined by the positioning unit, wherein the positioning unit comprises:

a plurality of receiving antennas for sensing disposed at positions separated by a same distance from a receiving antenna for communication included in a photonics-based sub-THz receiver unit.

2. The communication device of claim 1, wherein the photonics-based sub-THz transmission unit comprises:

a first optical signal generator;

a first optical modulator configured to optically modulate a first optical signal that is provided by the first optical signal generator, based on an externally injected baseband data signal;

a second optical signal generator configured to produce a second optical signal having a different wavelength from a wavelength of the first optical signal;

a first photodetector configured to generate a sub-THz signal by beating the first optical signal and the second optical signal; and at least one transmitting antenna configured to transmit the generated sub-THz signal.

3. The communication device of claim 1, wherein the positioning unit comprises:

at least one receiving antenna for sensing configured to receive a sub-THz signal reflected by the target;

a mixer configured to convert a sub-THz signal received through the receiving antenna for sensing into a baseband signal;

a second optical modulator configured to generate a third optical signal by optically modulating the baseband signal obtained through conversion by the mixer, based on a first optical signal optically modulated by a first optical modulator of the photonics-based sub-THz transmission unit;

a second photodetector configured to generate an optical beating signal by beating the third optical signal and the first optical signal; and a digital signal processor (DSP) configured to measure the position of the target using the optical beating signal.

4. The communication device of claim 3, wherein the DSP is configured to measure the position of the target using a time delay of the optical beating signal and a speed of the optical beating signal.

5. An operation method of a communication device combining a communication function and a positioning function, the operation method comprising:

transmitting, by a photonic-based sub-terahertz (sub-THz) transmission unit, a sub-THz signal generated by beating two optical signals having different wavelengths; and determining, by a positioning unit, position of a target using the sub-THz signal transmitted by the photonics-based sub-THz transmission unit and received by the positioning unit by being reflected by the target, wherein the transmitting of the sub-THz signal comprises:

adjusting a transmission direction of the sub-THz signal based on the position of the target determined by the positioning unit, wherein the positioning unit comprises:

a plurality of receiving antennas for sensing disposed at positions separated by a same distance from a receiving antenna for communication included in a photonics-based sub-THz receiver.

6. The operation method of claim 5, wherein the transmitting of the sub-THz signal comprises:

generating a first optical signal by a first optical signal generator;

optically modulating, by a first optical modulator, the output first optical signal based on an externally injected baseband data signal;

generating, by a second optical signal generator, a second optical signal having a different wavelength from a wavelength of the first optical signal;

generating, by a first photodetector, a sub-THz signal by beating the first optical signal and the second optical signal; and transmitting the generated sub-THz signal through at least one transmitting antenna.

7. The operation method of claim 5, wherein the determining of the position of the target further comprises:

receiving a sub-THz signal reflected by the target through at least one receiving antenna for sensing;

converting, by a mixer, a sub-THz signal received through the receiving antenna for sensing into a baseband signal;

providing, by a second optical modulator, a third optical signal by optically modulating the baseband signal obtained through conversion based on a first optical signal optically modulated by a first optical modulator of the photonics-based sub-THz transmission unit;

generating, by a second photodetector, an optical beating signal by beating the third optical signal and the first optical signal; and measuring, by a digital signal processor (DSP), the position of the target using the optical beating signal.

8. The operation method of claim 7, wherein the measuring of the position of the target comprises:

measuring the position of the target using a time delay of the optical beating signal and a speed of the optical beating signal.

9. A communication system combining a communication function and a positioning function, the communication system comprising:

a photonics-based sub-terahertz (sub-THz) transmission unit configured to transmit a sub-THz signal generated by beating two optical signals having different wavelengths;

a photonics-based sub-THz receiver unit configured to receive a sub-THz signal transmitted from another transmission unit using a local oscillator (LO) signal; and a positioning unit configured to determine a position of a target using the sub-THz signal transmitted by the photonics-based sub-THz transmission unit and received by the positioning unit by being reflected by the target, wherein the photonics-based sub-THz transmission unit is configured to adjust a transmission direction of the sub-THz signal based on the position of the target determined by the positioning unit, wherein the positioning unit comprises:

a plurality of receiving antennas for sensing disposed at positions separated by a same distance from a receiving antenna for communication included in a photonics-based sub-THz receiver unit.

10. The communication system of claim 9, wherein the photonics-based sub-THz transmission unit comprises:

a first optical signal generator;

a first optical modulator configured to optically modulate a first optical signal that is provided by the first optical signal generator, based on an externally injected baseband data signal;

a second optical signal generator configured to produce a second optical signal having a different wavelength from a wavelength of the first optical signal;

a first photodetector configured to generate a sub-THz signal by beating the first optical signal and the second optical signal; and at least one transmitting antenna configured to transmit the generated sub-THz signal.

11. The communication system of claim 9, wherein the photonics-based sub-THz receiver unit comprises:

at least one receiving antenna for communication configured to receive a sub-THz signal provided by another photonics-based sub-THz transmission unit;

a first mixer configured to convert a sub-THz signal received through the receiving antenna for communication into a baseband signal; and a baseband signal processor configured to restore a data signal from the baseband signal obtained through conversion by the first mixer.

12. The communication system of claim 9, wherein the positioning unit comprises:

at least one receiving antenna for sensing configured to receive a sub-THz signal reflected by the target;

a second mixer configured to convert a sub-THz signal received through the receiving antenna for sensing into a baseband signal;

a second optical modulator configured to provide a third optical signal by optically modulating the baseband signal obtained through conversion by the second mixer, based on a first optical signal optically modulated by a first optical modulator of the photonics-based sub-THz transmission unit;

a second photodetector configured to generate an optical beating signal by beating the third optical signal and the first optical signal; and a digital signal processor (DSP) configured to measure the position of the target using the optical beating signal.

13. The communication system of claim 12, wherein the DSP is configured to measure the position of the target using a time delay of the optical beating signal and a speed of the optical beating signal.

* * * * *